Oct. 28, 1924.
H. WHOMES
PROCESS AND APPARATUS FOR WELDING METAL SHEETS
Filed Sept. 1, 1923
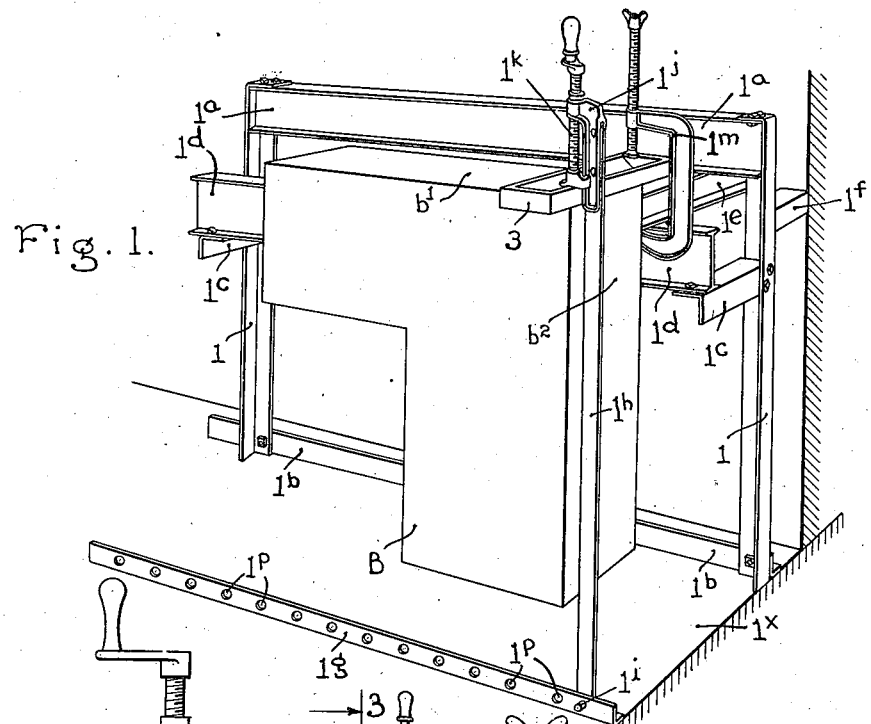
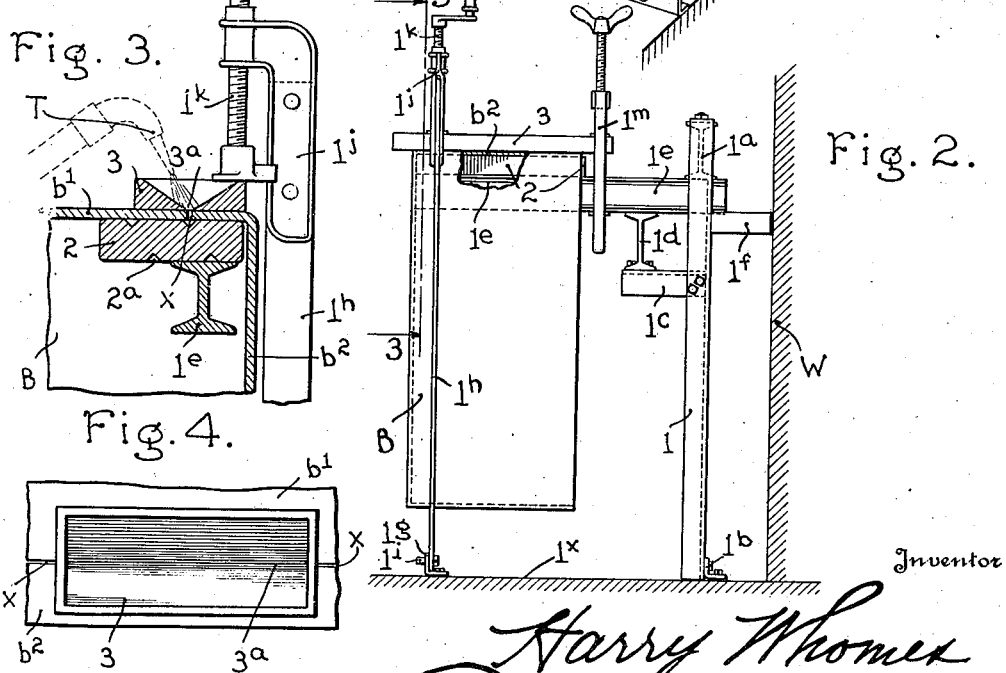
Inventor
Harry Whomes
Alexander Sowell
Attorneys.

Patented Oct. 28, 1924.

UNITED STATES PATENT OFFICE.

HARRY WHOMES, OF CHATTANOOGA, TENNESSEE, ASSIGNOR TO TENNESSEE FURNITURE CORPORATION, OF CHATTANOOGA, TENNESSEE, A CORPORATION OF TENNESSEE.

PROCESS AND APPARATUS FOR WELDING METAL SHEETS.

Application filed September 1, 1923. Serial No. 660,565.

*To all whom it may concern:*

Be it known that I, HARRY WHOMES, a citizen of the United States, residing at Chattanooga, in the county of Hamilton and State of Tennessee, have invented certain new and useful Improvements in Processes and Apparatus for Welding Metal Sheets; and I hereby declare that the following is a full, clear, and exact description thereof, reference being had to the accompanying drawings, which form part of this specification.

This invention is a novel process and apparatus for use in oxy-acetylene welding of metals and its principal object is to prevent or materially lessen the diffusion of heat through or into the body of the metal sheets during the welding process.

The invention has particular reference to the welding of metal sheets, such for example as are used in the manufacture of so-called seamless hollow bodies or linings for refrigerators. Such bodies or linings are usually made of metal sheets welded together at the joints, and a great deal of trouble has been experienced in the manufacture of such bodies by warping during the enameling or finishing processes, the warping being chiefly due to unequal alterations in the physical structure of the metal sheets caused by the large and unequal diffusion of heat over and through more or less of the body of the metal sheet during the welding process. This diffusion is quite noticeable after welding by the altered external appearance of the metal sheets, clearly showing how the heat has affected the physical structure of the metal extending from the welding steam over more or less of the entire area of the sheet.

I have provided a novel means and method whereby this undesirable diffusion of the heat through the body of the metal sheets during welding is prevented, or reduced to such a small extent that the physical structure of the sheets is not injuriously affected, and the objectionable warping of the bodies during the subsequent finishing or enameling treatments is practically overcome, resulting in greater economy in the manufacture of hollow sheet metal bodies, such as refrigerator linings.

I will explain the invention with reference to the accompanying drawings which illustrate one practicable embodiment thereof, to enable others to adopt and use the same; and will summarize in the claims the essentials of the invention, the novel process and apparatus, novel features of construction, and combinations of parts, for all of which protection is desired.

In the drawings:

Fig. 1 is a perspective view of an apparatus for use in carrying out the process, showing a hollow sheet metal refrigerator lining body in position for welding one of the joints thereof.

Fig. 2 is an end elevation of Fig. 1, partly broken.

Fig. 3 is an enlarged detail section on the line 3—3 Fig. 2.

Fig. 4 is a top plan view of one of the slotted jet directing heat absorbing members.

The apparatus, as shown, comprises an adjustable frame for supporting the sheet metal plates $b'$ and $b^2$ which are to be welded together, and a slotted jet directing heat absorbing member 3 adapted to be clamped above the plates which are to be united with the slot $3^a$ thereof adjacent and over the abutting edges of the plates preparatory to welding same. Preferably, a second heat absorbing member 2 is placed on the frame beneath the metal plates, at the abutting edges of the same or on the line where the plates are to be welded together.

In the construction shown the supporting frame comprises uprights 1, preferably angle irons, united at their tops by a horizontally disposed I-beam $1^a$, and united at their bottoms by an angle iron tie $1^b$, securely bolted thereto. The uprights 1 may be securely anchored in or supported on the flooring or base $1^x$ so as to support the apparatus firmly thereon. Uprights 1 are also preferably securely held in upright position by any suitable means such as by metal braces $1^f$ attached to the uprights 1 and anchored in or attached to the adjacent wall W of the building. The particular manner or means by which the uprights 1 are fixedly secured in upright position is not an essential feature of the invention.

To the uprights 1 at points below the beam $1^a$ are attached forwardly projecting arms $1^c$ upon which arms is supported a beam $1^d$, preferably an I-beam, which is disposed parallel with, but below beam $1^a$. Transversely mounted upon the beam $1^d$ are adjustable bars $1^e$, preferably small I-bars.

Beams $1^a$, $1^d$, and bars $1^e$ are so proportioned and positioned that when the bars $1^e$ rest upon the top of the beam $1^d$ the rear ends of said bars will engage the under side of the beam $1^a$, and thus the bars $1^e$ will be held by gravity in horizontal position since the bars $1^e$ project further in front of the beam $1^d$ than they do in rear thereof, and hence are practically held by their own gravital weight in any position to which they may be adjusted, the greater weight of the forward portions of the bars $1^e$ projecting in front of beam $1^d$ tending to cause them to tilt on the bars $1^d$ while the upper rear ends of the bars $1^e$ engaging the under side of the beam $1^a$ prevent their forward ends from dropping below a horizontal position. Bars $1^e$ may be readily manually adjusted by the workman raising their outer ends so as to slightly lower their inner ends clearing same of beam $1^a$, and the workman can then slide the bars $1^e$ lengthwise of the beam $1^d$ to any desired position.

The hollow bodies B, or metal plates which are to be welded, are supported upon the projecting outer ends of bars $1^e$ as shown in Fig. 1, and is preferably formed of metal plates butt-welded together at their meeting edges. In the example shown the weld which is to be formed is at the junction of the ends of plate $b'$ and plate $b^2$, the upper end of plate $b^2$ being bent over into the plane of the plate $b'$ the meeting edges of plate $b'$, $b^2$ abutting closely together as shown at $x$ in Figs. 3 and 4.

The heat absorbing member 2 is preferably an approximately rectangular iron casting, and is placed under the meeting edges $x$ of the plates and interposed between the plates and the supporting bar $1^e$, and member 2 is preferably provided with longitudinal V-shaped grooves $2^a$, in its top and bottom member 2 being so adjusted on the bars $1^e$ that one of the grooves $2^a$ thereof will coincide with or extend beneath the abutting edges $x$ of the plates which are to be welded.

Above the abutting edges $x$ of the plates $b'$, $b^2$ is placed a jet directing heat absorbing member 3 preferably made of cast iron, which member 3 has an elongated slot or opening $3^a$ in its bottom of slightly greater width than the slight space $x$ between the abutting edges of the plates. This member 3 is adapted to be placed over said plates $b'$, $b^2$ with the slot $3^a$ thereof extending lengthwise of and directly above the abutting edges $x$ of the plates. In the example, both the abutting edges and the slot $3^a$ are shown as being straight, but obviously if the butt-weld is to be curved or of any irregular shape, the slot $3^a$ in the heat absorbing member 3 should also be made curved or irregular to correspond in shape with the weld to be made.

Preferably member 3 is so formed that its upper face is concaved and its inner sides inclined inwardly and downwardly towards the slot $3^a$, as shown in Fig. 3. Thus the member 3 increases in thickness away from the slot $3^a$. The inclined inner surfaces of member 3 tend to direct the jet or flame from the burner head T toward the slot $3^a$ and confine its effects to the metal exposed through the slot $3^a$ at the abutting joint $x$ between the plates $b'$ and $b^2$ as shown in Fig. 3.

The apparatus is further provided with an angle bar $1^g$ which is preferably likewise anchored to the floor or base $1^x$ parallel with and in front of the angle bar $1^b$; and bar $1^g$ is preferably provided with a series of perforations $1^p$ in its upper leg any one of which perforations may be detachably engaged by a pin $1^i$ attached to the lower end of a bar $1^h$, the upper end of which bar $1^h$ is attached to clamp bracket $1^j$ carrying the usual clamping screw $1^k$. The bar $1^h$ can thus be readily adjusted into position longtiudinally so that the clamping screw $1^k$ can engage the upper face of the member 3, and cause the latter to bind or clamp the plates $b'$, $b^2$ in proper welding position on the member 2, and at the same time clamp the member 2 securely upon the bar $1^e$, as shown in Fig. 3, with slot $3^a$, groove $2^a$, and the meeting edges $x$ of the plates in vertical alignment.

If desired detachable hand clamps $1^m$ of the ordinary type may be used to further clamp the castings and plates to the bars $1^e$ so that the plates $b'$ and $b^2$ will be held with their edges abuting and clamped between the jet directing heat absorbing member 3, and the heat absorbing member 2.

When the members are thus clamped in welding position the ends of the plates are heated by means of a suitable flame, preferably an oxy-acetylene flame directed by a head T through the slot $3^a$ in member 3 and against the abutting edges $x$ of the plates $b'$ and $b^2$.

When the welding flame is thus directed against the abutting edges $x$ of the plates, the edges thereof are rapidly heated and welded together by direct contact with the flame, while at the same time any surplus heat instead of being applied directly to the plates, strikes the inclined sides of member 3 and is largely absorbed by the exposed upper surfaces of the member 3, and much of the heat of the flame which would ordinarily be transmitted to and through the plates behind the welding edge is absorbed by conduction in the castings 2 and 3. There is scarcely any lateral diffusion of heat through the area of the plates as compared with the diffusion of heat which takes place during the usual process of welding; and the undesirable changes in the physical structure of the plates are thus prevented.

The differences in diffusion of heat between a welded joint made by my above process using the heat absorbing members 2 and 3, and a welded joint produced by the identical flame in the identical plates under the ordinary welding processes where such members 2 and 3 are not used, is very marked since in the latter processes (where such members 2 and 3 are not used) the plates plainly show that there has been a diffusion of heat from the weld through a great part of such plates, whereas in my process there is scarcely any noticeable diffusion of heat from the joint. As a consequence articles such as hollow refrigerator linings made by my process and apparatus are not liable to warp during the subsequent finishing or enameling treatments; and thus greater economy results since there is less loss due to warping of the plates, and less time is required to perform the actual welding operation.

What I claim is:

1. In a sheet welding apparatus, a horizontal beam connecting the uprights, a second beam mounted on said arms below and slightly in front of the first beam and parallel therewith adjustable bars mounted upon the second beam and projecting beyond the same to support the sheets to be welded said bars having their rear ends engaged under the first beam, a slotted heat absorbing member, and means for clamping the heat absorbing member and sheets upon the bars, with the slot in said member disposed above the abutting edges of the sheets, the welding flame being directed through said slot.

2. In a sheet welding apparatus, a horizontal beam connecting the uprights, a second beam mounted on said arms below and slightly in front of the first beam and parallel therewith, and adjustable bars mounted upon the second beam and projecting beyond the same to support the sheets to be welded, said bars having their rear ends engaged under the first beam, a slotted heat absorbing member, a base member having a series of perforations, and a work clamp carrying bar for clamping the heat absorbing member and sheets upon the bars with the slot in said heat absorbing member disposed above the abutting edges of the sheets, said work clamp bar having a pin for engagement with the perforations in said base member.

3. In a sheet welding apparatus, a horizontal beam connecting the uprights, a second beam mounted on said arms below and slightly in front of the first beam and parallel therewith, and adjustable bars mounted upon the second beam and projecting beyond the same to support the sheets to be welded, said bars having their rear ends engaged under the first beam, and a work clamp carrying bar adjustably connected with the base, and a heat absorbing member adapted to be mounted on the sheets to be welded adjacent the abutting edges thereof, said member having a slot along the line of the weld, the welding flame being applied through the said slot to the abutting edges of the sheets.

4. In a sheet welding apparatus, a horizontal beam connecting the uprights, a second beam mounted on said arms below and slightly in front of the first beam and parallel therewith, and adjustable bars mounted upon the second beam and projecting beyond the same to support the sheets to be welded, said bars having their rear ends engaged under the first beam, and a work clamp carrying bar adjustably connected with the base, and a heat absorbing member adapted to be mounted on the sheets to be welded adjacent the abutting edges thereof, said member having a slot along the line of the weld, the welding flame being applied through the said slot; and a second heat absorbing member adapted to be mounted under the sheets adjacent the abutting edges thereof, and opposite the first heat absorbing member.

5. In a sheet welding apparatus, a base, uprights, a beam connecting the uprights, arms attached to the uprights below the first beam, a second beam mounted on said arms slightly below and parallel with the first beam, and adjustable bars mounted upon the second beam and projecting beyond the same to support the sheets to be welded, said bars having their rear ends engaged under the first beam, and a work clamp carrying bar longitudinally adjustably connected with the base, and a heat absorbing member adapted to be mounted on the sheets to be welded adjacent the abutting edges thereof, said member having a slot along the line of the weld, the welding flame being applied through the said slot to the abutting edges of the sheets.

6. In a sheet welding apparatus, a base, uprights, a beam connecting the uprights, arms attached to the uprights below the first beam, a second beam mounted on said arms slightly below and parallel with the first beam, and adjustable bars mounted upon the second beam and projecting beyond the same to support the sheets to be welded, said bars having their rear ends engaged under the first beam, and a work clamp carrying bar longitudinally adjustably connected with the base, a heat absorbing member adapted to be mounted on the sheets to be welded adjacent the abutting edges thereof, said member having a slot along the line of the weld, the welding flame being applied through the said slot to the abutting edges of the sheets, and a second heat absorbing member adapted to be mounted on the bars under the sheets adjacent the abutting edges thereof and opposite the first heat absorbing member.

7. Apparatus for the purpose specified, comprising a base; uprights; a beam mounted on the uprights; a second beam mounted on the uprights below and parallel with the first beam and in advance thereof; adjustable bars mounted upon the second beam and projecting beyond the same, and having their rear ends engaged under the first beam; adjustable means for clamping the sheets to be welded on said bar, and a heat absorbing member adapted to be mounted upon the sheets to be welded, and having a slot along the line of the weld, the welding flame being applied through the said slot to the abutting edges of the sheets.

8. Apparatus for the purpose specified, comprising a base; uprights; a beam mounted on the uprights; a second beam mounted on the uprights below and parallel with the first beam and in advance thereof, adjustable bars mounted upon the second beam and projecting beyond the same, and having their rear ends engaged under the first beam; means for clamping the sheets to be welded on said bars, and a heat absorbing member adapted to be mounted upon the sheets to be welded, and having a slot along the line of the weld, the welding flame being applied through the said slot to the abutting edges of the sheets, and a second heat absorbing member adapted to be mounted on the bars adjacent the abutting edges of the sheets and opposite the first heat absorbing member.

In testimony that I claim the foregoing as my own, I affix my signature.

HARRY WHOMES.